United States Patent
Ringwald et al.

(10) Patent No.: US 10,921,183 B2
(45) Date of Patent: Feb. 16, 2021

(54) OPTOELECTRONIC SENSOR AND METHOD FOR DETECTING OBJECTS IN A MONITORED ZONE

(71) Applicant: SICK AG, Waldkirch (DE)

(72) Inventors: Siegfried Ringwald, Waldkirch (DE); Christoph Menzel, Waldkirch (DE)

(73) Assignee: SICK AG, Waldkirch (DE)

( * ) Notice: Subject to any disclaimer, the term of this patent is extended or adjusted under 35 U.S.C. 154(b) by 128 days.

(21) Appl. No.: 16/298,139

(22) Filed: Mar. 11, 2019

(65) Prior Publication Data

US 2019/0277688 A1    Sep. 12, 2019

(30) Foreign Application Priority Data

Mar. 12, 2018    (DE) .......................... 10 2018 105 607

(51) Int. Cl.
*G01J 1/04*   (2006.01)
*G02B 6/42*   (2006.01)
(Continued)

(52) U.S. Cl.
CPC ........... *G01J 1/0422* (2013.01); *G01S 7/4816* (2013.01); *G01S 17/04* (2020.01); *G01V 8/10* (2013.01);
(Continued)

(58) Field of Classification Search
CPC .......... G01J 1/0422; G01J 1/0407; G01J 1/04; G01S 17/04; G01S 7/4816; G01S 7/481;
(Continued)

(56) References Cited

U.S. PATENT DOCUMENTS 4,963,859 A * 10/1990 Parks ........................ G07C 9/35
345/176
5,268,985 A * 12/1993 Ando .................... G01S 7/4816
359/34
(Continued)

FOREIGN PATENT DOCUMENTS

DE    19858769 A1    6/2000
DE    60001647 T2    4/2004
(Continued)

OTHER PUBLICATIONS

Office Action dated Jan. 31, 2019 issued in corresponding German Application No. 10 2018 105 607.9.

*Primary Examiner* — John R Lee
(74) *Attorney, Agent, or Firm* — Nath, Goldberg & Meyer; Jerald L. Meyer; Stanley N. Protigal (57) ABSTRACT

An optoelectronic sensor is provided for detecting objects in a monitored zone that has a light receiver having a reception optics arranged in front of it for generating a received signal from received light that is incident on the sensor in a direction of incidence of light from the monitored zone, wherein the reception optics comprises a flat light guide plate having a first main surface and a lateral edge bounding the first main surface at a side; and wherein the first main surface of the light guide plate is arranged transversely to the direction of incidence of light and deflects the incident received light to the lateral edge. The light guide plate here has a diffractive structure for deflection to the lateral edge.

18 Claims, 4 Drawing Sheets

(51) Int. Cl.
*G01V 8/10* (2006.01)
*G01S 7/481* (2006.01)
*G02B 27/42* (2006.01)
*G01V 8/14* (2006.01)
*G01S 17/04* (2020.01)

(52) U.S. Cl.
CPC ............... *G01V 8/14* (2013.01); *G02B 6/42* (2013.01); *G02B 6/4206* (2013.01); *G02B 6/4214* (2013.01); *G02B 27/42* (2013.01)

(58) Field of Classification Search
CPC ... G01V 8/10; G01V 8/12; G01V 8/14; G02B 6/42; G02B 6/4204; G02B 6/4206; G02B 6/4214; G02B 27/42; G02B 27/4233
See application file for complete search history.

(56) References Cited

U.S. PATENT DOCUMENTS

| | | | | |
|---|---|---|---|---|
| 5,506,929 | A * | 4/1996 | Tai | G02B 6/0038 385/146 |
| 6,935,764 | B2 * | 8/2005 | Choi | G02B 6/002 362/326 |
| 8,138,479 | B2 * | 3/2012 | Kothari | G06F 3/0428 250/353 |
| 10,496,227 | B2 * | 12/2019 | Wassvik | G06F 3/0421 |
| 2005/0088545 | A1 * | 4/2005 | Ito | H04N 1/1275 348/239 |
| 2009/0190094 | A1 * | 7/2009 | Watanabe | G02B 6/005 351/211 |
| 2009/0190373 | A1 * | 7/2009 | Bita | G02B 6/1226 362/620 |
| 2010/0187422 | A1 * | 7/2010 | Kothari | H05B 47/105 250/353 |
| 2011/0013868 | A1 * | 1/2011 | Suzumura | G02B 6/0041 385/32 |
| 2011/0096570 | A1 * | 4/2011 | Vissenberg | G02B 6/4298 362/615 |
| 2012/0294578 | A1 * | 11/2012 | Moore | G02B 6/10 385/129 |
| 2013/0181896 | A1 * | 7/2013 | Gruhlke | G06F 3/0428 345/156 |
| 2014/0261621 | A1 * | 9/2014 | Gruhlke | H01L 31/0543 136/246 |
| 2014/0261622 | A1 * | 9/2014 | Floyd | H01L 31/0547 136/246 |
| 2015/0289762 | A1 * | 10/2015 | Popovich | G02F 1/292 351/209 |
| 2016/0209657 | A1 * | 7/2016 | Popovich | A61B 3/113 |
| 2017/0177163 | A1 * | 6/2017 | Wallander | G06F 3/042 |
| 2017/0276947 | A1 * | 9/2017 | Yokoyama | G02B 5/32 |
| 2017/0285240 | A1 * | 10/2017 | Kuittinen | G02B 6/0016 |
| 2017/0299799 | A1 * | 10/2017 | Fattal | G02B 6/42 |
| 2018/0003805 | A1 * | 1/2018 | Popovich | G02B 26/106 |
| 2018/0067248 | A1 * | 3/2018 | Shinohara | G02B 30/56 |
| 2018/0299325 | A1 * | 10/2018 | Kemmler | G01J 3/2803 |
| 2019/0277688 | A1 * | 9/2019 | Ringwald | G01S 17/04 |

FOREIGN PATENT DOCUMENTS

| | | |
|---|---|---|
| DE | 202006017445 U1 | 9/2007 |
| DE | 102014102420 A1 | 8/2015 |
| EP | 1312936 A2 | 5/2003 |

* cited by examiner

OPTOELECTRONIC SENSOR AND METHOD FOR DETECTING OBJECTS IN A MONITORED ZONE

FIELD

The invention relates to an optoelectronic sensor, in particular a light barrier or a light sensor, for detecting objects in a monitored zone that has a light receiver having a reception optics arranged in front of it for generating a received signal from received light that is incident on the sensor in a direction of incidence of light from the monitored zone, wherein the reception optics comprises a flat light guide plate having a first main surface and a lateral edge bounding the first main surface at a side; and wherein the first main surface of the light guide plate is arranged transversely to the direction of incidence of light and deflects the incident received light to the lateral edge. The invention further relates to a method for detecting objects in a monitored zone in which a light receiver having a reception optics arranged in front of it generates a received signal from received light incident with a direction of incidence of light, wherein the received light is transversely, in particular almost perpendicularly, incident on a first main surface of a flat light guide plate of the reception optics and is deflected in the flat light guide plate to a lateral edge bounding the first main surface.

BACKGROUND

As a rule, optoelectronic sensors use a receiver lens to focus the light to be detected on their light receiver. Such receiver lenses have a certain construction size and focal length and a defined distance between the receiver lens and the light receiver results from this.

To achieve large ranges with a sensor, as much useful light as possible should be collected and the reception aperture should therefore be large. A large reception opening is, however, necessarily accompanied by a large construction depth. It can approximately be assumed that the diameter of the reception aperture corresponds to the required construction depth for the reception lens and the light receiver. This relationship can also not be broken up by a classical reception optics for which a large reception aperture with a very small focal length combined in an element makes contradictory demands.

Large reception apertures therefore mean a large construction depth and thus a large sensor construction shape. Small construction shapes, in particular small construction depths, cannot be equipped with a reception optics of a larger reception aperture for considerably increased ranges. Particularly with simple sensors such as miniature light barriers, however, a minimal construction depth of only a few millimeters is available for the optics, electronics, and mechanical components. With a sensor that is 3.5 mm small, for example, after deduction of housing walls, a circuit board, and electronic elements, just 1.5 mm are still available for the reception optics. An aperture of not substantially more than 1.5 mm is then possible with a classical reception optics.

An optical system having a light-permeable flat light guide plate is known from DE 1 985 769 A1. In different embodiments, the received light irradiating onto the flat side is directed to a light receiver through refractive sub-apertures, wedge surfaces, or layers of different refractive indices. This refractive arrangement, however, has only a small transmission efficiency and still results in a relatively large construction depth of a sensor equipped therewith of 5 to 10 mm.

An optoelectronic sensor is known from DE 10 2014 102 420 A1 whose reception optics has a diaphragm having an optical funnel element arranged downstream. The construction depth of the reception optics is, however, thereby even greater.

SUMMARY

It is therefore the object of the invention to enable a more compact construction shape of an optoelectronic sensor with a large range.

This object is satisfied by an optoelectronic sensor and by a method for detecting objects in accordance with the respective independent claim. The sensor has a light receiver having a reception optics for received light that irradiates from a direction of incidence of light from the monitored zone. The reception optics comprises a flat light guide plate that is oriented in a planar manner with respect to the received light at which therefore a first main surface or flat side is transverse, in particular almost perpendicular, to the direction of incidence of light. The received light is then deflected in the direction of a lateral edge in the light guide plate. The light receiver is arranged at the lateral edge, with even further optical elements also being able to be provided between the lateral edge and the light receiver.

The invention now starts from the basic idea of providing the light guide plate with a diffractive structure. The light guide plate thus becomes a diffractive flat-plate collector that collects received light with its first main surface and guides it to the lateral edge. The diffractive structure provides the deflection, that is the change of direction, of the received light from the direction of incidence of light in a direction substantially within the plane of the circuit board. The condition for total reflection is then satisfied afterward and the received light thus propagates within the plane of the light guide plate toward the lateral edge. Without the deflection, the condition for total reflection would be transverse due to the direction of incidence of light, in particular almost perpendicular to the first main surface, and the received light would simply exit the oppositely disposed second man surface again. The diffractive structure can be arranged at the first main surface and/or at the second main surface.

The invention has the advantage that the connection of a reception optics having a small construction depth and a large aperture is made possible by the reception optics having the diffractive flat plate collector, and indeed with a construction depth that can even be very small with respect to the reception aperture since the surface taken up by the light guide plate can be very large. The reception optics only has a relatively small acceptance angle that is determined by the angular selectivity of the diffractive structure and by the critical angle of the total reflection in the light guide plate. Received light of too oblique an incidence is therefore not deflected and is forwarded on in total reflection. This produces a lateral field of vision restriction or a kind of diaphragm effect that is, however, only advantageous with a sensor aligned to a useful light source. The diffractive structure acts, in addition to its deflection function, as an optical bandpass filter that can be adapted to a known useful light source and so improves the signal-to-noise ratio with extraneous light. The manufacture of the reception optics is possible very inexpensively, particularly with high volumes, since a tool-bound method such as injection compression molding can be used in which mainly one-time costs arise for the tool itself.

The received signal of the light receiver is preferably evaluated in a control and evaluation unit to obtain information on objects. A possible result of the evaluation is a binary object determination signal depending on whether an object is detected or not, for instance by a threshold value comparison such as is generated by light barriers and simple switching light sensors.

The reception optics preferably has a funnel element arranged at the lateral edge. The funnel element, also called a tapered element or simply a taper, has a cross-section that corresponds to the lateral edge and that tapers toward the light exit side. The light receiver is arranged at the light exit side, with even further optical elements being able to be present therebetween. With the combination of light guide plate and funnel element, the reception optics is configured as a diffractive flat plate collector having a refractively tapered optics.

The funnel element is preferably of a flat design and its surface direction is aligned in the extension of the main surface. The funnel element thus directly adjoins the light guide plate and continues the main surface, with a certain angle out of the plane of the main surface being conceivable. The received light is concentrated in both cross-sectional directions outside the funnel element. In the one axis perpendicular to the main surface and to the funnel element, the diffractive structure and the usually multiple total reflection within the plane of the main surface of the flat light guide plate provide this. The cross-section of the received light is therefore only as high as the small thickness of the light guide plate. The funnel element tapers in the second axis along the lateral edge and thus provides the concentration.

The light guide plate and the funnel element are preferably formed in one piece. This produces a particularly simple design. The funnel element thus not only optically continues the light guide plate, but also forms a common element.

The funnel element preferably has a non-linear taper. The concentration effect can thereby be further improved or a shorter length of the funnel element is made possible. A linear taper would mean that the funnel element represents a trapezoid in the plan view in parallel with the direction of incidence of light. Non-linear is, for example, a parabolic shape or any desired free-form shape in which, however, the lateral flanks face monotonously inwardly to achieve the taper defining the funnel element or to achieve the concentration effect.

The funnel element is preferably mirror coated. There can thereby only be internal reflections and no light losses. Unlike the pure total reflection, this does not depend on the material and the reflection angle.

A deflection element is preferably arranged at an end disposed opposite the light guide plate. The deflection element particularly preferably provides a deflection in the direction of the incidence of light, that is transverse and in particular almost perpendicular to the first main surface. In other words, the direction of propagation of the received light after the deflection element is that at which the received light would exit a conventional reception lens, but laterally offset by the extent of the light guide plate and the funnel element. The beam exiting at the deflection element will additionally have a considerably larger angle of reflection, but this widening has no further effect if the light receiver is seated directly there or close enough. The advantage of such a deflection element is that the light receiver can be oriented as in a conventional sensor with the plane of the light-sensitive surface in parallel with the first main surface. A circuit board on which the light receiver is arranged can thus be aligned in parallel with the main surface. The circuit board thus hardly takes up any construction depth since its surface extent does not relate to the construction depth. At the outlet of the funnel element, without a deflection element, the light receiver would have to be arranged transversely or substantially perpendicular to the first main surface, which would be an obstacle in achieving a small construction depth of the total sensor. A prism can, for example, be considered as a deflection element, alternatively a curved attachment piece of the funnel element. The deflection element can be mirror coated to improve the efficiency.

The deflection element preferably has beam shaping properties. Concentrating or focusing beam shaping properties are particularly advantageous to further reduce the cross-section of the received light on incidence on the light receiver. For this purpose, a deflection element formed as a prism can have curved surfaces having a spherical curvature, an aspheric curvature, or a free-form shape.

The diffractive structure preferably has a grating structure. A grating structure can be relatively simply specified and generated on the light guide plate. It is particularly preferably an echelette grating (blazed grating) that diffracts a large portion of the light energy irradiated inward in the desired spectrum in an order of magnitude that corresponds to the desired deflection. An echelette grating is consequently adapted to a useful light spectrum and there are only small light losses on the deflection of useful light to the lateral edge.

The grating structure is preferably linear. This is a particularly simple diffractive structure that effects the desired deflection from the direction of incidence of light into the plane of the main surface with a suitable orientation.

In an alternative preferred embodiment, the light guide plate has a non-linear grating structure as the diffractive structure to additionally defect the received light inwardly in the plane of the first main surface. Such a non-linear grating structure first satisfies the primary object of the deflection of the received light toward the lateral edge and thus toward the light receiver or toward the funnel element. In addition, however, the non-linear, for example curved, grating structure also provides a deflection within the plane in parallel with the first main surface. Such a non-linear grating structure is a little more complex to determine and to manufacture. However, it supports the concentration effect of the optical funnel element that can be correspondingly shorter or even replaces it.

The light guide plate preferably has at least two segments whose grating structures are differently aligned to additionally deflect the received light inwardly in the plane of the first main surface. The segments are divided by separating lines through the first main surface transversely to the lateral edge, that is they are a kind of stripes whose narrow sides together form the lateral edge. Except for a possible central segment, the segments or at least their grating structures are inclined a little toward the center of the lateral edge. In a similar manner to a matching non-linear grating structure, a concentration effect thus already results in the light guide plate that supports or replaces the funnel element. The grating structures are here preferably linear; the inward deflection then only takes place, unlike with a non-linear base structure, due to the different orientation. It is also conceivable to form segments and nevertheless to provide non-linear grating structures per segment. The concentration effects of the non-linear grating structure and of the inwardly oriented alignment of the respective grating structure then complement one another.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
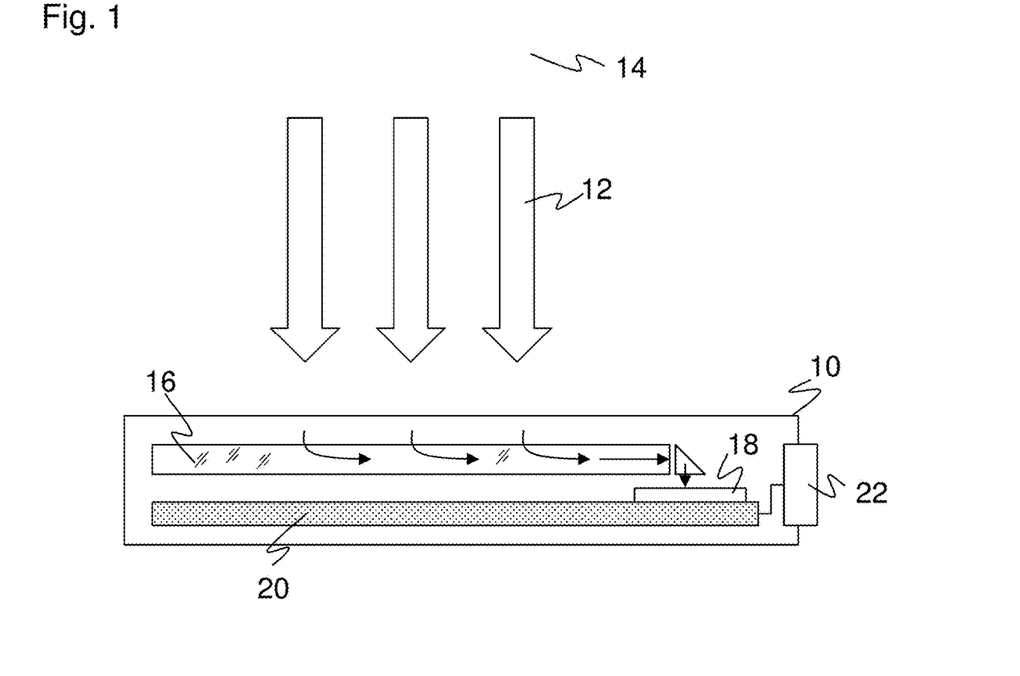
FIG. 1 a schematic view of an optoelectronic sensor with a flat plate collector as a reception optics.

FIG. 1 shows a schematic block diagram of an optoelectronic sensor 10. Received light 12 from a monitored zone 14 is incident on a flat reception optics 16 having a large aperture with a direction of incidence of light corresponding to the arrows to collect as much received light 12 as possible. The reception optics 16 initially deflects the received light 12 laterally and then a further time back into the direction of incidence of light before it is incident on a light receiver 18. The second deflection is optional; otherwise the light receiver 18 is oriented perpendicularly.

The reception optics 16 and its light deflection will be explained in more detail below in different embodiments with reference to FIGS. 3 to 8. Only their rough geometrical design is initially of interest, namely that it is particularly flat.

The light receiver 18 generates an electronic received signal from the incident received light 12, said electronic received signal being supplied to a control and evaluation unit 20. In FIG. 1, the control and evaluation unit 20 is only shown symbolically as a circuit board on which the light receiver 18 is also arranged. They are generally any desired analog and/or digital evaluation modules such as one or more analog circuits, microprocessors, FPGAs, or ASICs, with or without an analog preprocessing.

The parallel alignment of the reception optics 16, the light receiver 18, and the circuit board with the control and evaluation unit 20, on which other electronics can also be accommodated, permits a total structure of the optoelectronic sensor in the shown flat construction with an extremely small construction depth of only a few millimeters.

Due to the deflection, the control and evaluation unit 20 receives a sweeping intensity signal that is suitable for evaluations in which the light spot geometry or a piece of angular information of the incident received light 12 is not required. An example is a threshold value comparison to determine the presence of objects. Time of flight measurements are also conceivable provided that the demands on accuracy are not too high since in the millimeter range different light paths mix in the reception optics 16. The result of the evaluation, for example a switching signal corresponding to the binary object determination signal or a measured distance can be output at an interface 22.

The sensor 10 shown in FIG. 1 is passive, that is it receives received light 12 of any desired source. Instead, however, received light 12 from an associated light transmitter can also be received. In the case of a through beam sensor, the light transmitter is located on the oppositely disposed side of the monitored zone 14 and the control and evaluation unit 20 can recognize objects in the beam path by an intensity drop because they cover the light transmitter.

Figure 2:
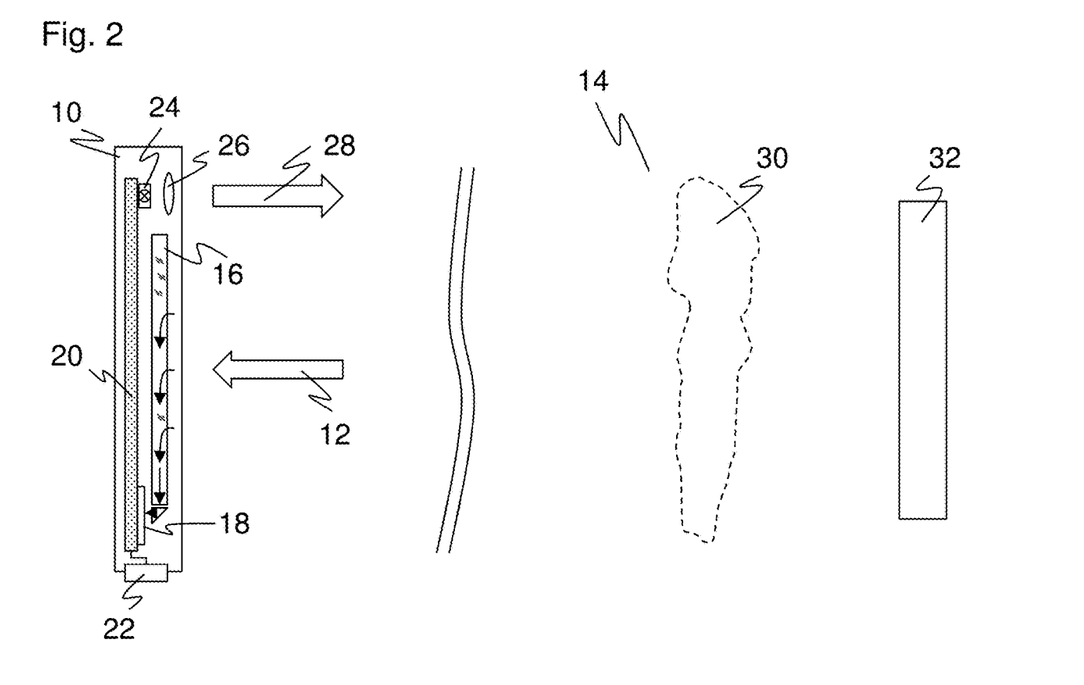
FIG. 2 a schematic view of a further embodiment of an optoelectronic sensor as a light sensor or as a reflection light barrier.

FIG. 2 shows a further embodiment of an optoelectronic sensor 10 having its own light transmitter 24 together with an associated transmission optics 26. The received light 12 is in this case its own transmission light 28 after it has been reflected back in the monitored zone 14. This is the principle of a light sensor that recognizes an object 30 when the transmitted light 28 is incident thereon and is remitted. However, it is also the functional principle of a reflection light barrier to which a cooperative reflector 32 belongs to which the transmitted light 28 is aligned. The control and evaluation unit 20 in this case expects the received light 12 reflected back by the reflector 32. If an object 30 moves in front of the reflector 32, the received level drops and the object 30 can be recognized thereby; for example again by a threshold value comparison. To distinguish its own transmitted light 28 from extraneous light and thus to make the switching behavior substantially more robust, two polarization filters can be arranged in the transmission and reception path whose direction of polarization is crossed in accordance with a polarization rotation of the reflector 32.

Figure 3:
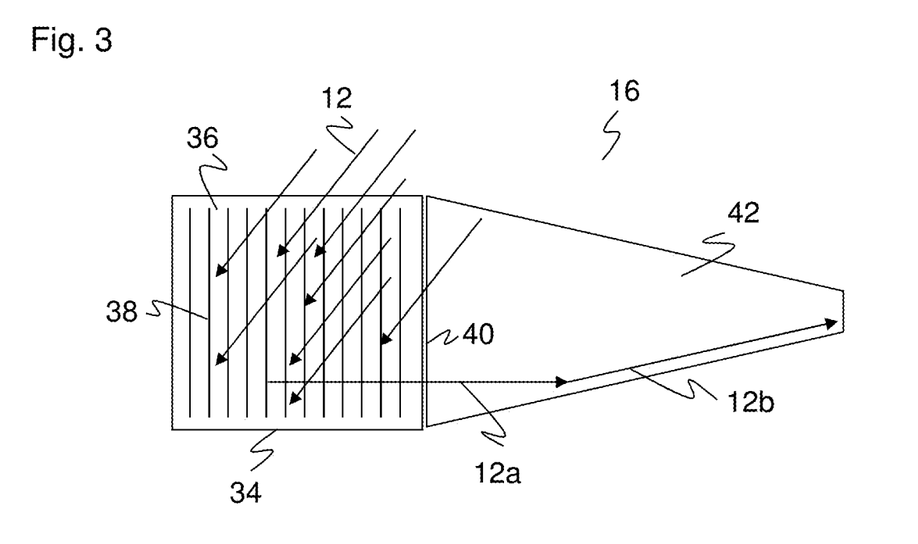
FIG. 3 a schematic plan view of a reception optics configured as a flat plate collector.

FIG. 3 shows a schematic plan view of the reception optics 16. The received light 12 is shown symbolically by a plurality of arrows whose direction of incidence is substantially perpendicular to the plane of the paper which can only be perspectively indicated.

The reception optics 16 has a flat light guide plate 34 or a flat plate collector. In a plan view, only the upper main surface 36 or a flat side of the flat light guide plate 34 can be recognized. In the depth direction perpendicular to the plane of the paper, the light guide plate 34 is very thin; its thickness is smaller by factors than the lateral extent of the main surface 36. The light guide plate 34 collects received light 12 with a very large aperture with the main surface 36.

A diffractive structure 38 on the light guide plate 34 provides a deflection of the received light 12 toward a lateral edge 40. The diffractive structure 38 can be upwardly arranged at the first main surface 36 and/or downwardly at the oppositely disposed flat side. After the deflection, received light 12a propagates in a new direction, to the right in FIG. 3, within the light guide plate 34, and is guided in total reflection in so doing. The lateral edge 40 is not necessarily only a single straight part piece, but can also be straight in parts with edge segments at an angle close to 180° with respect to one another or can be curved.

The diffractive structure 38 can in particular be an echelette grating (blazed grating). Such an echelette grating diffracts incident received light 12 of a defined wavelength by a very large amount and almost only in a specific order of diffraction. The diffraction is therefore chromatically selective, which simultaneously provides the advantage of an optical bandpass effect that can be matched to its own light transmitter 24. The diffraction is additionally very direction-specific due to the high maximum in an order of diffraction. A new preferred direction of the bundle of beams toward the lateral edge 40 is thereby produced at such flat angles that the deflected received light 12a remains in the light guide plate 34 due to total reflection. No received light 12 is diffracted in the direction of the further edges of the light guide plate 34 so that nothing is lost there either. It would, however, also be possible to apply a mirror coating here.

Optionally, a second light collecting or light concentrating function adjoins the coupling into the light guide plate 34 through the diffractive structure 38 and thus the deflection in the light guide plate 34 to the lateral edge 40. For this purpose, an optical funnel element 42 is preferably arranged at the lateral edge 40. The optical funnel element 42 is an element that tapers in cross-section and that generates the received light 12b concentrated in a transverse direction of the funnel element 42 in parallel with the extent of the lateral edge 40.

Figure 4:
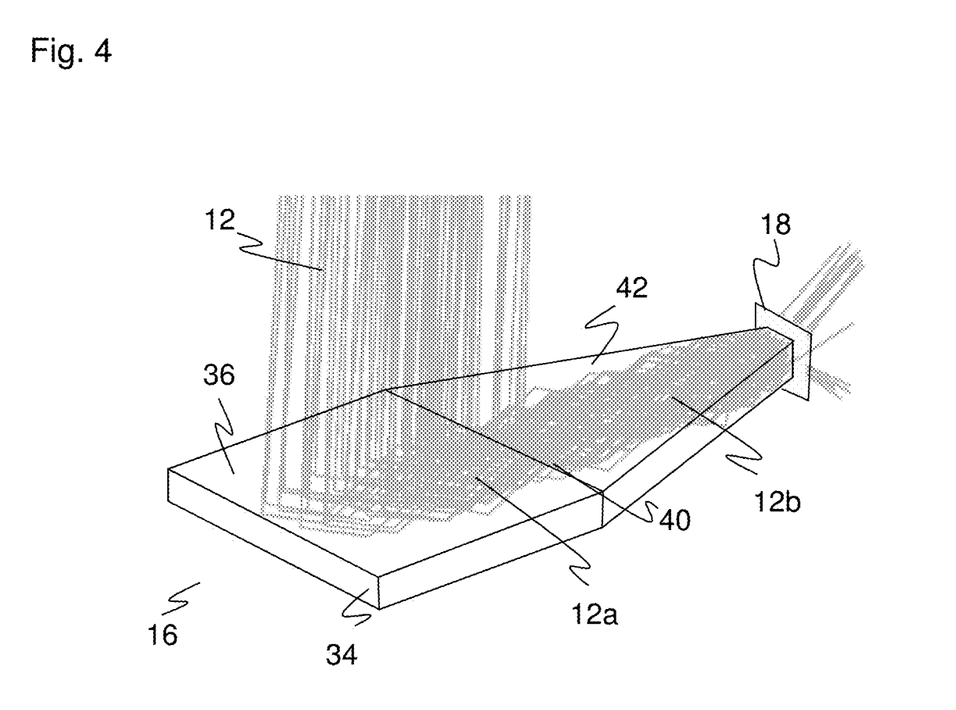
FIG. 4 a three-dimensional view of an exemplary beam extent in a reception optics in accordance with FIG. 3.

The beam extent in the reception optics 16 becomes better understandable by a simulated example that is show in a three-dimensional view in FIG. 4. The almost perpendicular incident light 12 is diffracted at the upper side or lower side by the diffractive structure 38 and is conducted as deflected received light 12a to the lateral edge 40. This becomes concentrated received light 12b in the funnel element 42 that is incident on the light receiver 18 arranged at a beam exit point of the funnel element 42.

The received light 12 is thus concentrated in both cross-sectional directions. The extent is limited in the vertical direction by the small thickness of the light guide plate 34 that continues in the optical funnel element 42 or that is even further reduced there. The focusing effect or concentration effect comes into force in the width direction, in parallel with the lateral edge, due to the cross-section reducing geometry of the optical funnel element 42. Both axes satisfy the condition of the waveguide-led total reflection. The light guide plate 34 and the optical funnel element 42 are manufactured from suitable transparent plastic such as PMMA or PC. Mirror coatings can be applied to support the total reflection.

The optical funnel element 42 is preferably equally of a flat design like the light guide plate 34 and thus directly adjoins the shape of the lateral edge 40. It is possible to configure both in one piece. To further optimize the beam shaping in the optical funnel element 42, the taper can also have a parabolic or a different tapering cross-sectional extent.

FIG. 5 again shows a three-dimensional view of an exemplary beam extent in a reception optics 16. Unlike FIG. 4, the light receiver 18 itself is not already located at the beam exit side of the funnel element 42, but a further deflection element 44 is rather first arranged therebetween for the light coupling into the light receiver 18. The exiting received light 12c thus practically again returns in the original direction of incidence of light, only laterally offset and widened by the extent of the reception optics 16, which does not, however, play any role in the proximity of the light receiver 18. Due to the direction of incidence of light, the light receiver 18 an be aligned in parallel with the main surface 36 and this enables the particularly flat arrangement shown in FIG. 1 and having a circuit board of the control and evaluation unit 20 in parallel with the reception optics 16.

Figure 5:
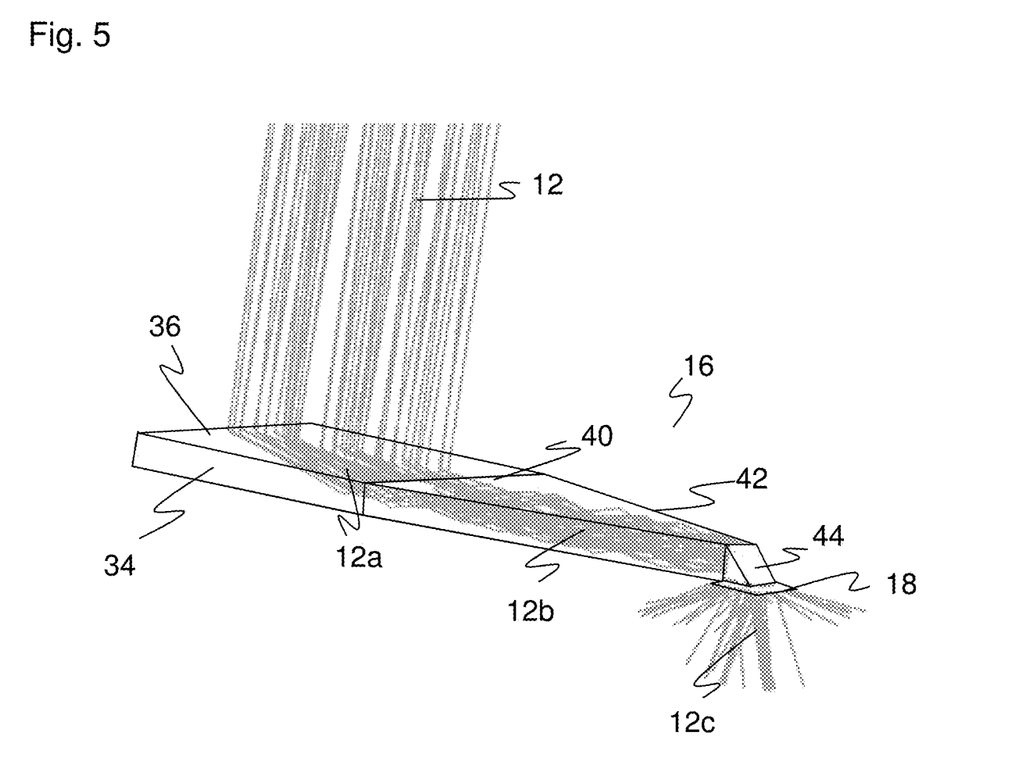
FIG. 5 a three-dimensional view similar to FIG. 4, but in a varied perspective and with a reception optics having an additional deflection element at the outlet side.

The deflection element 44 is designed as a deflection prism in FIG. 5. The prism can have planar surfaces or can additionally have a light focusing shape, for instance with spherically or aspherically curved surfaces or with a free-form surface. The prism, like the optical funnel element 42, can be at least partially mirror coated to reduce decoupling losses, in particular at the end of the optical funnel element. Alternatively to a separate deflection element 44, it is also conceivable to configure the optical funnel element 42 with a kind of downwardly directed continuation, preferably with a mirror coating that satisfies this function. The light guide plate 34, the funnel element 42 and/or the deflection element 44 can be formed in one piece.

Figure 6:
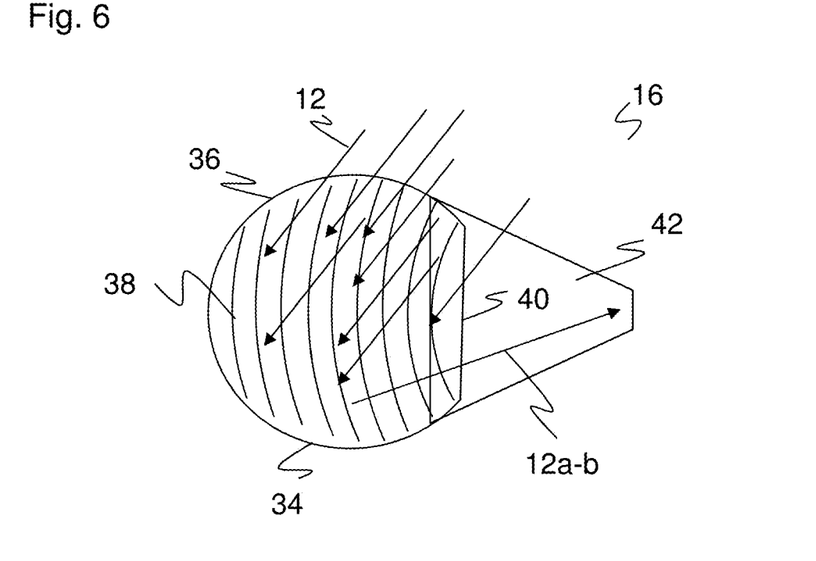
FIG. 6 a schematic plan view of a reception optics configured as a flat plate collector and with a non-linear grating structure.

FIG. 6 shows a plan view of a further embodiment of the reception optics 16. in the embodiment in accordance with FIG. 3, the diffractive structure 38 is configured as a linear grating arrangement. A pure deflection and a concentration only in the depth direction of the light guide plate 34 accordingly take place. The concentration in the second lateral axis only takes place in the optical funnel element 42 there.

In the embodiment in accordance with FIG. 6, a non-linear grating arrangement is instead now provided as a diffractive structure. The received light 12 is thereby already immediately concentrated in both axes. The funnel element 42 can accordingly be shorter or even be completely omitted.

Figure 7:
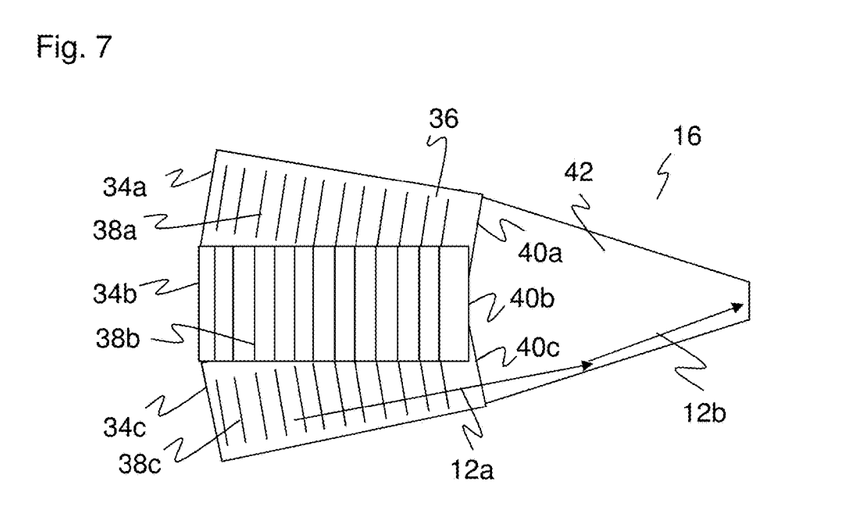
FIG. 7 a schematic plan view of a reception optics configured as a flat plate collector with a plurality of segments.

FIG. 7 shows a plan view of a further embodiment of the reception optics 16. The light guide plate 34 is here divided into at least two segments 34a-c that are approximately of cross-stripe type and divide the lateral edge 40 accordingly. The number of segments is initially not limited. The segments 34a, c are slightly inwardly tilted, with the exception of the central segment 34b. Strictly speaking, this is only relevant to the linear grating arrangement 38a, c thereon.

A certain concentration also already takes place in a lateral direction due to the segmented arrangement of linear grating arrangements 38a-c. The segmentation is therefore an alternative to a non-linear grating arrangement in accordance with FIG. 6 to manage with a shorter funnel element 42 or even completely without the funnel element 42. A segmentation in accordance with FIG. 7 can, however, also be combined with non-linear grating structures in accordance with FIG. 6.

Figure 8:
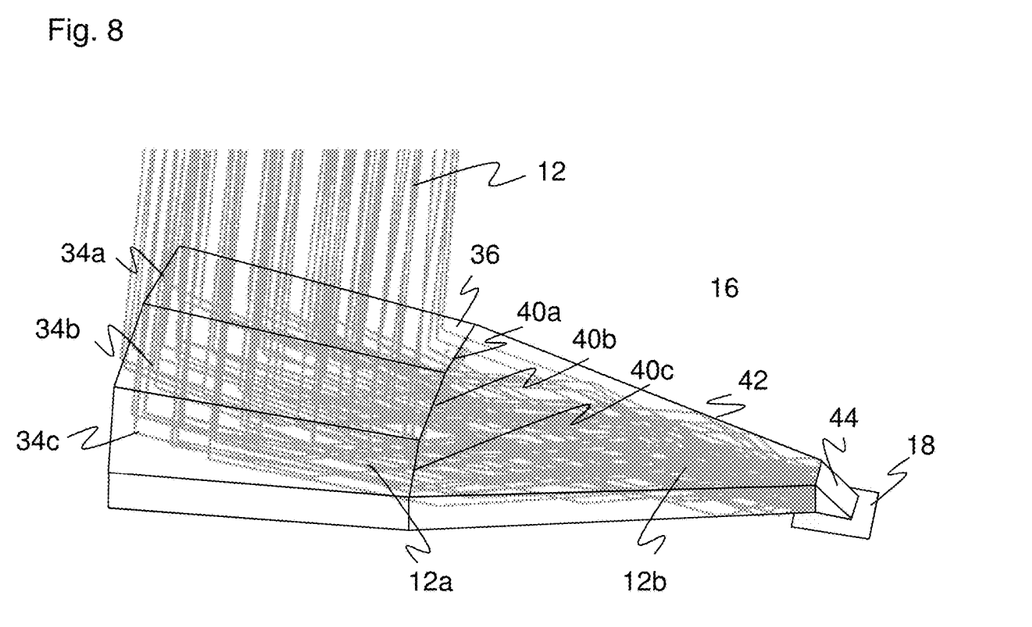
FIG. 8 a three-dimensional view of an exemplary beam extent in a reception optics in accordance with FIG. 7.

FIG. 8 illustrates an exemplary optical path in a reception optics 16 having a segmented light guide plate 34a-c as in FIG. 7 in a three-dimensional view. An angle of ±9° was here selected as the setting angle of the outer segments 34a, c. The surface at the inlet, that is in the main surface 36, amounts to 4 mm*4.2 mm; at the outlet in front of the light receiver 18, the surface amounts to 1.2 mm*1.2 mm. A coupling efficiency of the total reception optics 16 of 56% can thus be achieved overall with a partially mirror-coated deflection prism 44.

A reception aperture of 25 mm$^2$ and more is, for example, achieved with a diffractive flat plate collector in accordance with the invention with a construction depth of only 1 mm. Larger reception apertures of, for example, 6 mm*8 mm are also possible. The signal gain thus increases by an order of magnitude; the range of the sensor can be increased by factors of two, three, and more. There are in this respect extremely small construction depths of, for example, only 3.5 mm that would only permit a conventional aperture of 1.5 mm. In accordance with the invention, these 1.5 mm are available for the thickness of the flat reception optics 16 that, however, provides an immeasurably larger surface with edge lengths that exceed the thickness by a factor of two, three, and more in both directions.

The invention claimed is:

1. An optoelectronic sensor for detecting objects in a monitored zone, the optoelectronic sensor comprising a light receiver having a reception optics arranged in front of it for generating a received signal from received light that is incident on the sensor in a direction of incidence of light from the monitored zone,
    wherein the reception optics comprises a flat light guide plate having a first main surface and a lateral edge bounding the first main surface at a side,
    wherein the first main surface of the light guide plate is arranged transversely to the direction of incidence of light and deflects the incident received light inwardly to the lateral edge to direct the toward the light receiver and differentially aligned to deflect the received light inwardly in a plane of the first main surface to establish a concentration effect,
    and wherein the light guide plate has a diffractive structure for deflection to the lateral edge.

2. The optoelectronic sensor in accordance with claim 1, wherein the optoelectronic sensor is one of a light barrier and a light sensor.

3. The optoelectronic sensor in accordance with claim 1, wherein the reception optics has a funnel element arranged at the lateral edge.

4. The optoelectronic sensor in accordance with claim 3, wherein the funnel element is flat and its surface direction is aligned in an extension of the main surface.

5. The optoelectronic sensor in accordance with claim 3, wherein the light guide plate and the funnel element are formed in one piece.

6. The optoelectronic sensor in accordance with claim 3, wherein the funnel element has a non-linear taper.

7. The optoelectronic sensor in accordance with claim 3, wherein the funnel element is mirror coated.

8. The optoelectronic sensor in accordance with claim 3, wherein a deflection element is arranged at an end of the funnel element disposed opposite the light guide plate.

9. The optoelectronic sensor in accordance with claim 8, wherein the deflection element has beam shaping properties.

10. The optoelectronic sensor in accordance with claim 1, wherein the diffractive structure has a grating structure.

11. The optoelectronic sensor in accordance with claim 10, wherein the grating structure is an echelette grating.

12. The optoelectronic sensor in accordance with claim 10, wherein the light guide plate has a non-linear grating structure as the diffractive structure to deflect the received light inwardly in the plane of the first main surface.

13. The optoelectronic sensor in accordance with claim 10, wherein the light guide plate has at least two segments whose grating structures are differently aligned to deflect the received light inwardly in the plane of the first main surface.

14. A method of detecting objects in a monitored zone in which a light receiver having a reception optics arranged in front of it generates a received signal from received light incident with a direction of incidence of light,
    wherein the received light is transversely incident on a first main surface of a flat light guide plate of the reception optics and is deflected in the flat light guide plate inwardly to a lateral edge bounding the first main surface to direct the light toward the light receiver and differentially aligned to deflect the received light inwardly in a plane of the first main surface to establish a concentration effect,
    and wherein the received light is deflected by means of a diffractive structure of the light guide plate.

15. The method in accordance with claim 14,
    wherein the received light is incident almost perpendicularly on a first main surface of a flat light guide plate of the reception optics and is deflected in the flat light guide plate to a lateral edge bounding the first main surface.

16. An optoelectronic sensor for detecting objects in a monitored zone, the optoelectronic sensor comprising a light receiver having a reception optics arranged in front of it for generating a received signal from received light that is incident on the sensor in a direction of incidence of light from the monitored zone,
    wherein the reception optics comprises a flat light guide plate having a first main surface and a lateral edge bounding the first main surface at a side, and having a grating structure to deflect the light,
    wherein the first main surface of the light guide plate is arranged transversely to the direction of incidence of light and deflects the incident received light inwardly to the lateral edge to direct the light toward the light receiver and differentially aligned to deflect the received light inwardly in a plane of the first main surface to establish a concentration effect,
    and wherein the light guide plate has a diffractive structure for deflection to the lateral edge.

17. The optoelectronic sensor in accordance with claim 16,
    wherein the light guide plate has a non-linear grating structure as the diffractive structure to deflect the received light inwardly in the plane of the first main surface.

18. The optoelectronic sensor in accordance with claim 16,
    wherein the light guide plate has at least two segments whose grating structures are differently aligned to deflect the received light inwardly in the plane of the first main surface.

* * * * *